(12) United States Patent
Lecuyer et al.

(10) Patent No.: US 9,200,520 B2
(45) Date of Patent: Dec. 1, 2015

(54) GAS TURBINE CONICAL FLANGE BOLTED JOINT

(75) Inventors: Raymond Joseph Lecuyer, Taylors, SC (US); John Herbert Dimmick, Greenville, SC (US); Ashok Kumar Haveri Murigeppa, Karnataka (IN); Gang Liu, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 725 days.

(21) Appl. No.: 13/530,355

(22) Filed: Jun. 22, 2012

(65) Prior Publication Data

US 2013/0343902 A1 Dec. 26, 2013

(51) Int. Cl.
*F01D 5/06* (2006.01)
*F16D 1/033* (2006.01)

(52) U.S. Cl.
CPC .............. *F01D 5/066* (2013.01); *F16D 1/033* (2013.01); *F05D 2250/70* (2013.01); *F05D 2260/31* (2013.01)

(58) Field of Classification Search
CPC ............. F01D 5/06; F01D 5/66; F01D 5/025; F01D 5/026; F16D 1/033; F05D 2260/31
USPC .......................................... 416/214 R, 204 R
See application file for complete search history.

(56) References Cited

U.S. PATENT DOCUMENTS

| | | | |
|---|---|---|---|
| 3,135,538 A * | 6/1964 | George ........................... 285/363 |
| 5,230,540 A * | 7/1993 | Lewis et al. .................... 285/363 |
| 5,239,540 A | 8/1993 | Rovira et al. |
| 5,499,849 A | 3/1996 | Fend |
| 5,675,873 A | 10/1997 | Groess |
| 6,267,553 B1 * | 7/2001 | Burge ............................ 415/115 |
| 6,364,371 B1 | 4/2002 | Mckay |
| 6,672,630 B2 | 1/2004 | Pinzauti et al. |
| 8,079,773 B2 * | 12/2011 | Blanton ......................... 403/335 |
| 8,313,264 B2 * | 11/2012 | Webjorn ........................ 403/183 |
| 8,894,360 B2 | 11/2014 | Pegouet |

(Continued)

FOREIGN PATENT DOCUMENTS

| | | |
|---|---|---|
| CN | 102016232 A | 4/2011 |
| CN | 102235182 A | 11/2011 |

(Continued)

OTHER PUBLICATIONS

Search Report from EP Application No. 13171593.0 dated Sep. 13, 2013.

(Continued)

*Primary Examiner* — Dwayne J White
*Assistant Examiner* — Joshua R Beebe
(74) *Attorney, Agent, or Firm* — Ernest G. Cusick; Hoffman Warnick LLC

(57) ABSTRACT

A bolted flange assembly for securing rotating components in a gas turbine. The bolted flange assembly includes two rotating wheels, each wheel having at least one arm extending towards a spacer positioned partially between the two rotating wheels, wherein each arm has a flange surface facing the spacer. Either each flange surface or a surface of the spacer is conical, i.e., non-perpendicular to a centerline of the gas turbine, such that in an unconstrained state, a heel end of each flange surface is closer to the spacer than a toe end of each flange surface; and a bolt extending through the arm of each rotating wheel and the spacer.

12 Claims, 5 Drawing Sheets

(56) References Cited

U.S. PATENT DOCUMENTS

2011/0243743 A1    10/2011  Wilson et al.
2011/0274541 A1*   11/2011  Belmonte et al. .......... 415/213.1
2012/0263597 A1    10/2012  Delapierre et al.
2012/0301305 A1*   11/2012  Alvanos et al. ........... 416/204 R

FOREIGN PATENT DOCUMENTS

| | | | |
|---|---|---|---|
| EP | 0921273 | A1 | 6/1999 |
| EP | 1273815 | A2 | 1/2003 |
| FR | 2938292 | A1 | 5/2010 |

OTHER PUBLICATIONS

EP Office Action issued on Feb. 27, 2015 in relation to corresponding EP application 13171593.0.

Office Action for CN Patent Application No. 201310248620.2, dated Sep. 11, 2015, 9 pages.

\* cited by examiner

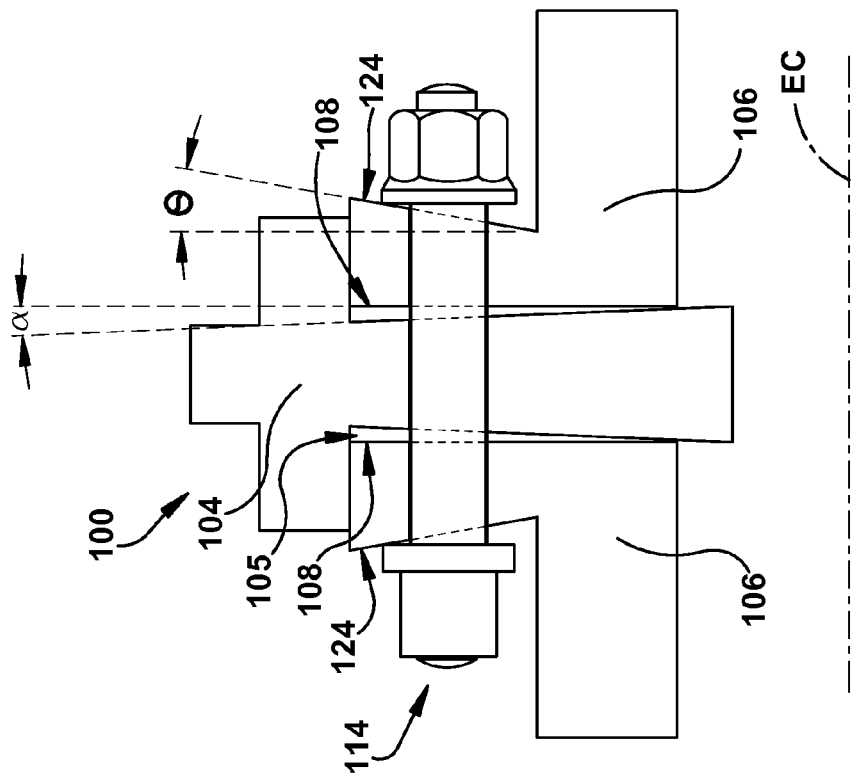
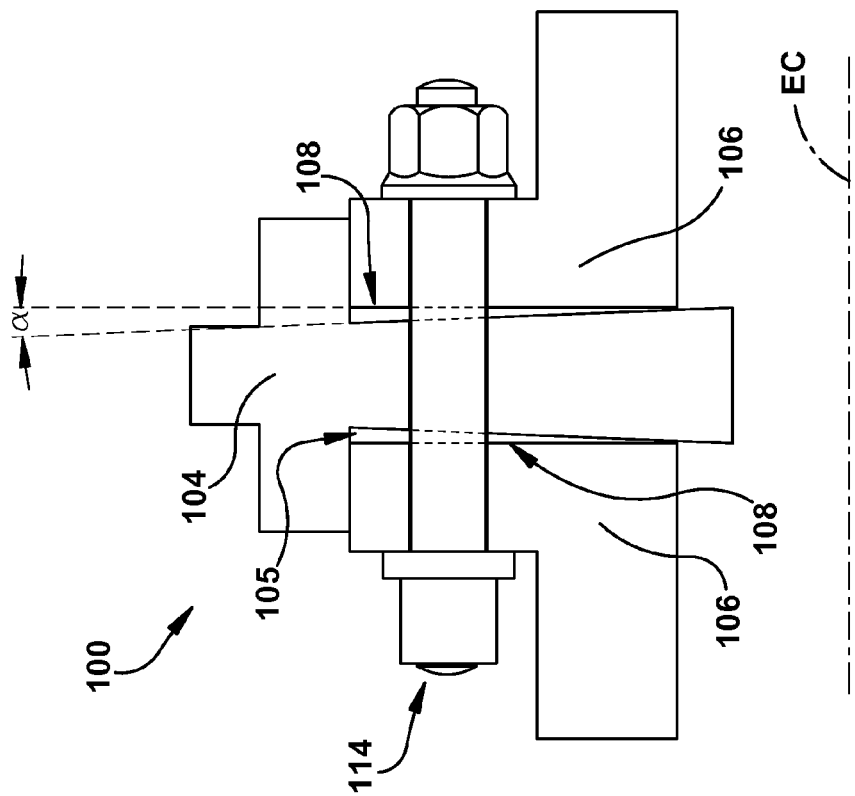

GAS TURBINE CONICAL FLANGE BOLTED JOINT

FIELD OF THE INVENTION

The subject matter disclosed herein relates to gas turbine engines and, more particularly, to a conical flange bolted joint for use in securing rotating components.

BACKGROUND OF THE INVENTION

Conventional bolted joints in a gas turbine engine are either through-bolted or flange bolted. In through-bolted designs, long bolts pass through all components of the rotor module. This means that all components will have holes interrupting the main rotor structure. These interruptions are often the highest stressed locations on the wheels and will have the lowest predicted Low Cycle Fatigue (LCF) lives. In flange-bolted designs, shorter bolts pass though flanged appendages on the rotor wheels thus avoiding interruptions in the main wheel structure. Although this alleviates the LCF issue due to the presence of the holes, this configuration causes other challenges for high cycle fatigue (HCF). For example, this configuration of bolted joints may pry apart at the heel of the flange during engine operation. This prying is caused both by the presence of rabbet interferences that keep the disk centerline's aligned and by thermal gradients in the gas turbine rotor. The gas turbine rotor is very heavy and gravity causes the rotor to sag under its own weight, subjecting the bolted joints to high cycle fatigue (HCF). If the flange heels are open during engine operation, the wheel arms and bolts can be subjected to high levels of HCF stress.

BRIEF DESCRIPTION OF THE INVENTION

A bolted flange assembly for securing rotating components in a gas turbine is disclosed. The bolted flange assembly includes two rotating wheels, each wheel having at least one arm extending towards a spacer positioned partially between the two rotating wheels, wherein each arm has a flange surface facing the spacer. Either each flange surface or a surface of the spacer is conical, i.e., non-perpendicular to a centerline of the gas turbine, such that in an unconstrained state, e.g., with a bolt untightened, a heel end of each flange surface is closer to the spacer than a toe end of each flange surface; and a bolt extending through the arm of each rotating wheel and the spacer. The bolted flange assembly does not require the bolts to pass through the highly stressed wheels thus solving the LCF problem. In addition, the flange conical interface prevents the flange heel from opening which could lead to high cyclic stresses and ultimately HCF failure of the bolt.

A first aspect of the invention provides a bolted flange assembly for securing rotating components in a gas turbine, the bolted flange assembly comprising: two rotating wheels, each wheel having at least one arm extending towards a spacer positioned partially between the two rotating wheels, wherein each arm has a flange surface facing the spacer, and at least a portion of each flange surface is non-perpendicular to a centerline of the gas turbine such that in an unconstrained state, a heel end of each flange surface is closer to the spacer than a toe end of each flange surface; and a bolt extending through the arm of each rotating wheel and the spacer.

A second aspect of the invention provides a bolted flange assembly for securing rotating components in a gas turbine, the bolted flange assembly comprising: two rotating wheels, each wheel having at least one arm extending towards a conical spacer positioned partially between the two rotating wheels, wherein each arm has a flange surface facing a surface of the conical spacer, wherein each flange surface is perpendicular to a centerline of the gas turbine, and the surface of the conical spacer is non-perpendicular to the centerline of the gas turbine, such that in an unconstrained state, a heel end of each flange surface is closer to the spacer than a toe end of each flange surface; and a bolt extending through the arm of each wheel and the spacer.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIGS. 2-6 show cross-sectional views of various embodiments of a bolted flange assembly according to embodiments of the invention.

Figure 1:
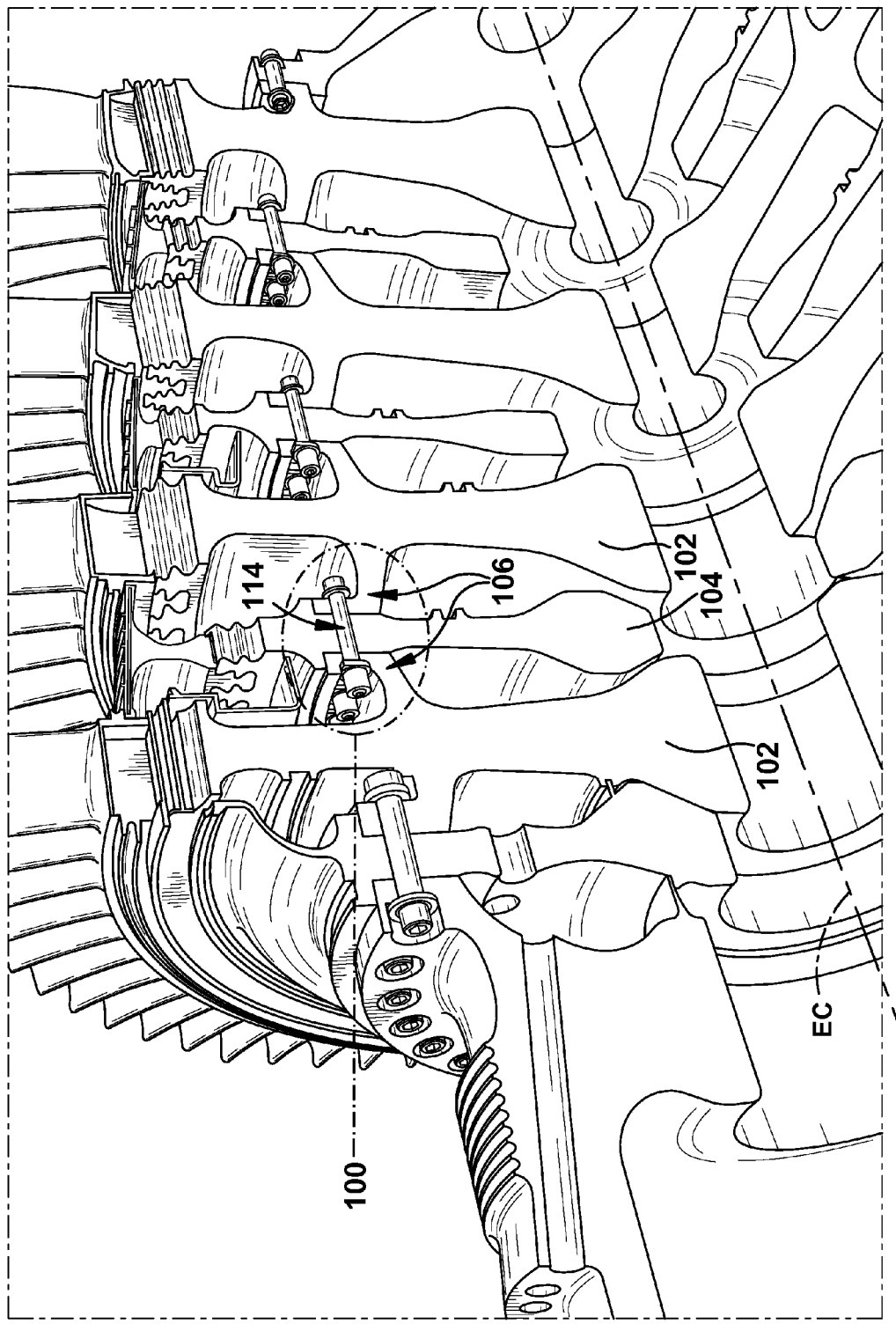
FIG. 1 shows a cut-away perspective view of a portion of a gas turbine rotor including a bolted flange assembly according to an embodiment of the invention.

It is noted that the drawings of the disclosure may not be to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

A conventional gas turbine bolted joint has a flange face (i.e., an interface between an arm of a wheel and a spacer) which is machined perpendicular to the gas turbine centerline and a rabbet that is machined parallel to a centerline of the gas turbine. The rabbet surfaces on typical gas turbines are on the inner diameter (ID) and use interference fits to keep mating parts of the rotor concentric during rotor assembly and operation. In conventional bolted joints, the rabbet interferences tend to cause the flange heel (at the inner diameter) to pry open. The flange heel tends to have additional prying during thermal operation in the engine environment. The heavy rotors used in gas turbines tend to sag under their own weight, and can generate significant high cycle fatigue stresses. If the flange heel is open, the bulk of the alternating load due to gravity sag is no longer absorbed by the flange in stack compression but rather, is carried by the bolts as additional tensile load. The rabbet interferences on the ID of the conventional bolted assembly can offer a redundant load path to this gravity sag load. Due to space considerations and rotor/stator configurations, not all gas turbine rotors can utilize a rabbet on the ID, and when the rabbets are on the outer diameter (OD) they do not aid in carrying gravity sag load if the flange heel is open.

Turning to FIG. 1, a bolted flange assembly 100 for securing rotating components in a gas turbine according to an embodiment of the invention is shown. FIG. 1 shows a cut-away perspective view of a portion of a gas turbine rotor, showing a portion of the rotating components. Specifically, a plurality of rotating wheels 102 are shown, and a plurality of spacers 104, with each spacer 104 positioned at least partially between wheels 102.

Figure 2:
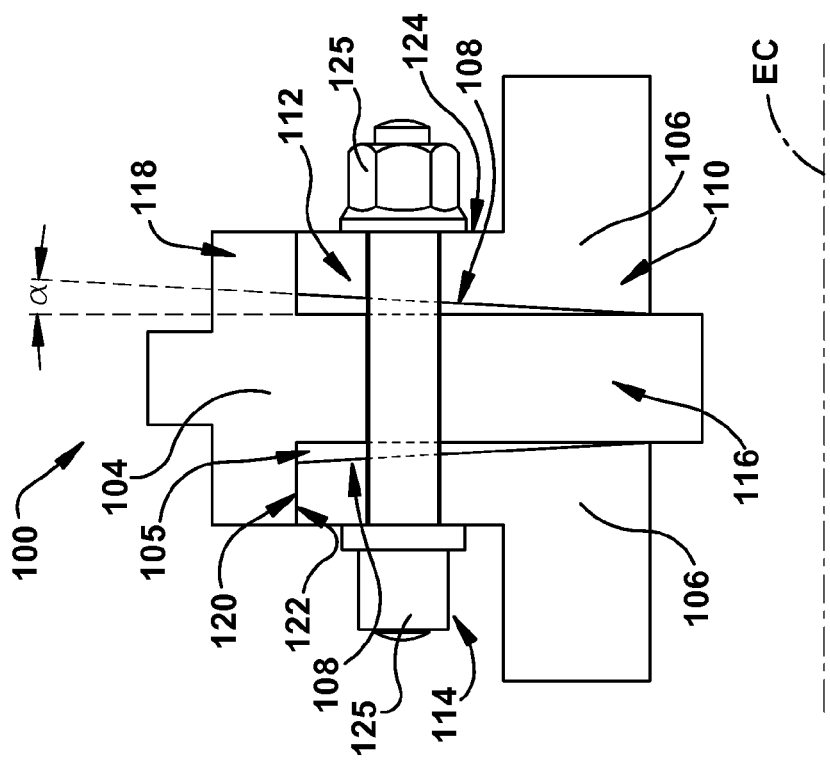

As can be seen in FIG. 1, each rotating wheel 102 has a pair of arms 106 extending from opposite sides of wheel 102. Arms 106 can be any desired shape, for example, L-shaped as shown in FIG. 1. Each arm 106 extends towards a spacer 104. As shown in a simplified cross-sectional view in FIG. 2, each arm 106 has a flange surface 108 facing a spacer 104, and a nut facing surface 124 opposite flange surface 108. As shown in FIG. 2, flange surface 108 has a first end 110 (also referred to as the heel) and a second end 112 (also referred to as the toe).

According to one embodiment of the invention, as shown in FIG. 2, the interface between flange surface 108 and spacer 104 can include an angled gap 105 between flange surface 108 and spacer 104. For example, each flange surface 108 of each arm 106 can be machined to be conical, i.e., non-perpendicular to a centerline of the gas turbine (referred to herein, and shown in figures as engine centerline, EC) for example, at an angle, α, with respect to the spacer 104 that the arm 106 faces. In other words, flange surface 108 is not parallel to spacer 104. Angling flange surface 108 in this way positions the heel 110 of each flange surface 108 closer to spacer 104 than the toe 112 of each flange surface 108. In one embodiment, angle, α, can be approximately 0.1 degree to approximately 1.0 degree. Flange surface 108 can be angled by machining arms 106 into a conical shape, or any other shape that would result in a non-perpendicular angle with respect to the gas turbine centerline.

As can be seen in FIG. 2, spacers 104 can be at least partially positioned between arms 106, for example, each spacer 104 can have an inner portion 116 between flange surfaces 108 of arms 106, and an outer portion 118, substantially perpendicular to inner portion 116. As shown best in FIG. 2, outer portion 118 can have a rabbet 120 causing an interference fit with a surface 122 of each arm 106. As discussed above, rabbet 120 is positioned at the toe 112. In one embodiment, rabbet 120 is positioned on an outer diameter (OD), i.e., radially outward from bolt 114, and in another embodiment, rabbet 120 is positioned on an inner diameter (ID), i.e., radially inward from bolt 114.

As shown in FIGS. 1 and 2, each bolt assembly 100 includes a bolt 114 extending through each arm 106 of each rotating wheel 102 and the spacer 104 between arms 106. Assembly 100 further includes at least one nut 125 configured to attach to each end of bolt 114, with nut(s) 125 contacting nut facing surfaces 124 of arms 106 when nut(s) 125 are attached. FIGS. 2-6 show assembly 100 in an unconstrained state, i.e., bolt 114 has not yet been tightened. In the unconstrained state, there is a gap 105 (shown exaggerated in FIG. 3) between toe 112 of each flange surface 108 and spacer 104, and substantially no gap between heel 110 of flange surface 108 and spacer 104. In other words, the heel area is closed, while the toe area is open. Once bolt 114 is tightened, there is substantially no gap between each flange surface 108 and spacer 104, i.e., both the heel area and the toe areas are closed.

Figure 3:
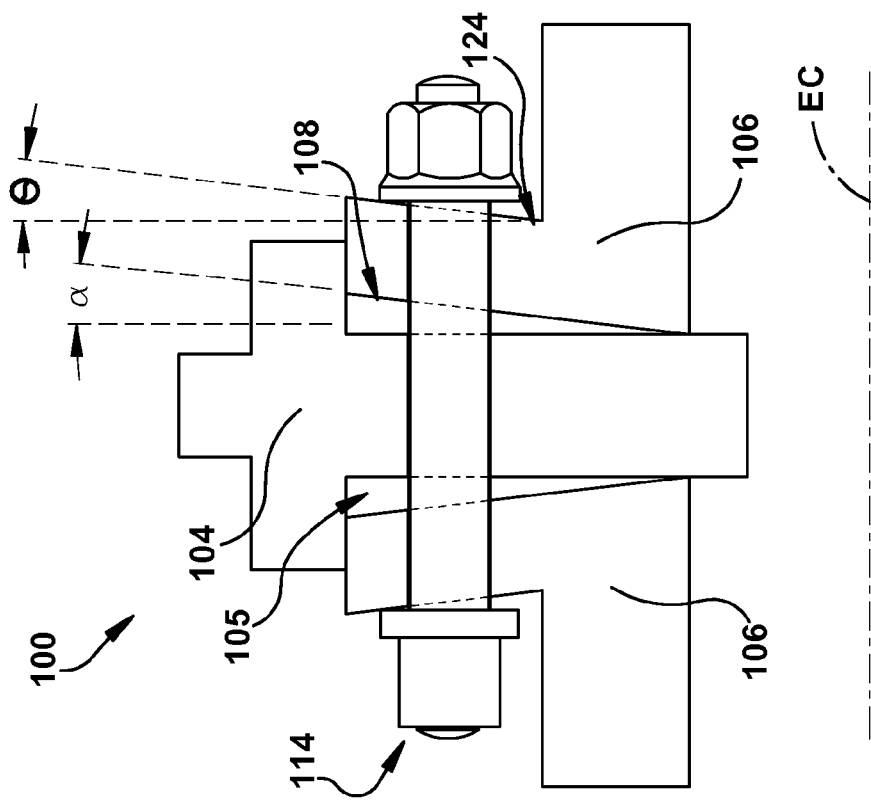

In one embodiment, as shown in FIG. 3, in addition to a non-perpendicular flange surface 108, an arm 106 further include a nut facing surface 124 that is non-perpendicular to the engine centerline, EC, for example, nut facing surface 124 can be conical, i.e., angled at an angle, θ away from perpendicular. This conical nut facing surface 124 can act to lessen any bending of bolt 114 that could tend to occur using assembly 100. In one embodiment, angle, θ, can be approximately 0.1 degree to approximately 1.0 degree.

In another embodiment, shown in FIG. 4, the surfaces of spacer 104 are non-perpendicular to the engine centerline, while flange surfaces 108 of arms 106 are substantially perpendicular to the engine centerline. For example, spacer 104 can be machined in a conical shape, or any other shape that would result in the surfaces of spacer 104 being non-perpendicular to the engine centerline. In this way, a gap 105 is again formed between the toe 112 of each flange surface 108 and spacer 104, while substantially no gap exists between the heel 110 of each flange surface 108 and spacer 104.

In another embodiment, shown in FIG. 5, spacer 104 is angled to be non-perpendicular to the engine centerline as in FIG. 4, to create the angled gap 105 between spacer 104 and arm 106. However, different from FIG. 4, in FIG. 5, while flange surfaces 108 are substantially perpendicular to the engine centerline, nut facing surfaces 124 are angled such that they are non-perpendicular to the engine centerline.

Figure 6:
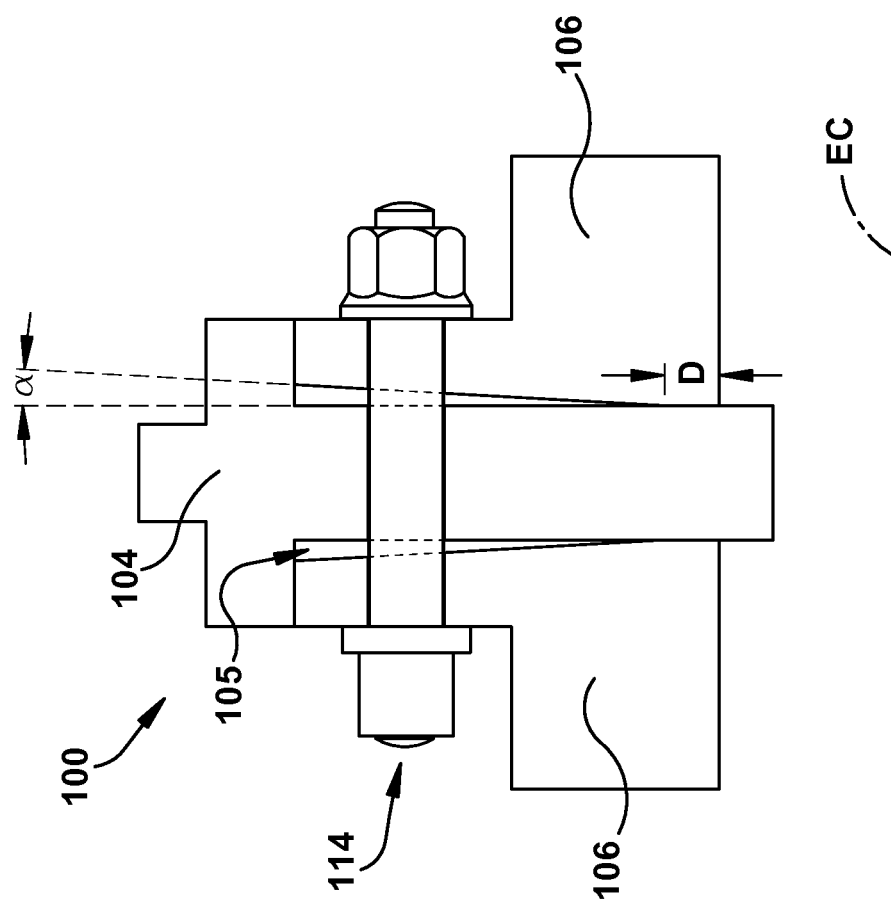

It is also noted that while FIGS. 2-5 show angled surfaces that are angled across an entire interface, from an inner end to an outer end, it is understood that only a portion of each interface between spacer 104 and flange surfaces 108 could be non-parallel. For example, as shown in FIG. 6, a portion of the interface between flange surfaces 108 can include both surfaces being substantially planar, i.e., no gap, while a portion can include at least surface that is angled, i.e., non-perpendicular to the engine centerline. For example, a portion of the interface between spacer 104 and arms 106, labeled as distance, D, can include both surfaces 104, 108 are perpendicular to the engine centerline. As long as there is a gap 105 at the toe area, and substantially no gap at the heel area, when the assembly is in an unconstrained state, assembly 100 will function as desired.

Figure 7:
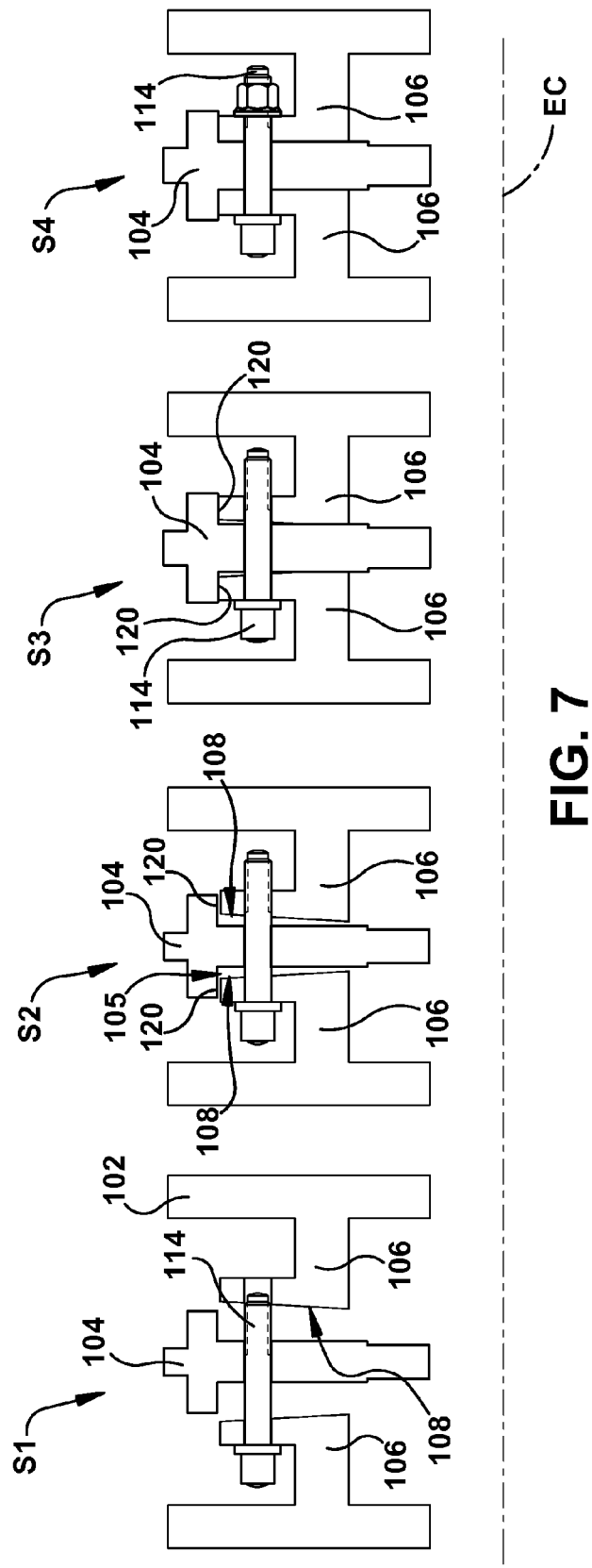
FIG. 7 shows a method using a bolted flange assembly according to an embodiment of the invention.

A method using an embodiment of the invention disclosed herein is shown in FIG. 7. As shown in step S1, a spacer 104 is positioned at least partially between two arms 106 of two adjacent wheels 102. At least one of a flange surface 108 and spacer 104 is non-perpendicular to the engine centerline. In the embodiment shown in FIG. 7, a configuration similar to that shown in FIG. 2 is shown, with spacer 104 having a substantially straight outer surface, i.e., perpendicular to the engine centerline, and flange surfaces 108 being conical, i.e., non-perpendicular to the engine centerline. But it is understood that the configurations shown in FIGS. 3-6 can also be used. As shown in step S1, bolt 114 is inserted through arms 106 and spacer 104.

In step S2, spacer 104 is heated to overcome rabbet 120 interference. As spacer 104 is heated, spacer 104 will expand. As shown in step S2, because at least one of a flange surface 108 and spacer 104 (flange surface 108, in the example shown in FIG. 7) is non-perpendicular to the engine centerline, a gap 105 exists between spacer 104 and flange surface 108. In other words, the heel portion of the interface between arms 106 and spacer 104 is closed, i.e., no gap, but there is a gap 105 at the toe portion. In step S3, spacer 104 is allowed to cool, and rabbets 120 between spacer 104 and arms 106 are engaged. In step S4, bolt 114 is tightened, and gap 105 is closed. As shown in step S4, heel area has remained closed, and now that bolt 114 has been tightened and the parts have cooled, there is also no gap at the toe area.

The apparatus and method of the present disclosure is not limited to a gas turbine, but can be used in any apparatus with rotating parts that need to be secured.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bolted flange assembly for securing rotating components in a gas turbine, the bolted flange assembly comprising:
    two rotating wheels, each wheel having at least one arm extending towards a spacer positioned partially between the two rotating wheels,
    a flange surface disposed on each arm, wherein the flange surface faces the spacer, and at least a portion of each flange surface is non-perpendicular to a centerline of the gas turbine,
    wherein the spacer includes a first portion disposed between the arms of the two wheels and a second portion that is substantially perpendicular to the first portion, the first portion extending further in a radially outward direction than the flange surface of each arm, and the second portion being disposed radially outward of the flange surface of each arm such that a rabbet interference fit exists between the second portion and a toe end of each flange surface, and in an unconstrained state, a heel end of each flange surface is closer to the spacer than the toe end of each flange surface; and
    a bolt extending through the arm of each rotating wheel including the flange surface, and the spacer.

2. The bolted flange assembly of claim 1, wherein at least a portion of the flange surface of each arm is angled with respect to the spacer at an angle of approximately 0.1 degrees to approximately 1.0 degree.

3. The bolted flange assembly of claim 1, wherein each arm further includes a nut facing surface, opposite the flange surface, wherein at least a portion of the nut facing surface is non-perpendicular to the centerline of the gas turbine.

4. The bolted flange assembly of claim 3, wherein the nut facing surface of each arm is angled with respect to the spacer at an angle of approximately 0.1 degree to approximately 1.0 degree.

5. The bolted flange assembly of claim 1, wherein each arm is substantially L-shaped.

6. The bolted flange assembly of claim 1, wherein in the case that the bolt is not tightened, there is a gap between the toe end of each flange surface and the spacer, and substantially no gap between the heel end of each flange surface and the spacer; and in the case that the bolt is tightened, there is substantially no gap between each flange surface and the spacer.

7. A bolted flange assembly for securing rotating components in a gas turbine, the bolted flange assembly comprising:
    two rotating wheels, each wheel having at least one arm extending towards a conical spacer positioned partially between the two rotating wheels,
    a flange surface disposed on each arm, wherein the flange surface faces a surface of the conical spacer,
    wherein each flange surface is perpendicular to a centerline of the gas turbine, and the surface of the conical spacer is non-perpendicular to the centerline of the gas turbine,
    wherein the conical spacer has a first portion disposed between the arms of the two wheels and a second portion that is substantially perpendicular to the first portion, the first portion extending further in a radially outward direction than the flange surface of each arm, and the second portion being disposed radially outward of the flange surface of each arm such that a rabbet interference fit exists between the second portion and a toe end of each flange surface, and in an unconstrained state, a heel end of each flange surface is closer to the conical spacer than the toe end of each flange surface; and
    a bolt extending through the arm of each wheel including the flange surface, and the conical spacer.

8. The bolted flange assembly of claim 7, wherein the conical spacer is angled with respect to each flange surface of each arm at an angle of approximately 0.1 degree to approximately 1 degree.

9. The bolted flange assembly of claim 7, wherein each arm further includes a nut facing surface opposite the flange surface, wherein at least a portion of the nut facing surface is non-perpendicular to the centerline of the gas turbine.

10. The bolted flange assembly of claim 9, wherein the conical nut facing surface of each arm is angled with respect to the flange surface of the arm at an angle of approximately 0.1 degree to approximately 1.0 degree.

11. The bolted flange assembly of claim 7, wherein each arm is substantially L-shaped.

12. The bolted flange assembly of claim 7, wherein in the case that the bolt is not tightened, there is a gap between the toe end of each flange surface and the conical spacer, and substantially no gap between the heel end of each flange surface and the conical spacer; and in the case that the bolt is tightened, there is substantially no gap between each flange surface and the conical spacer.

* * * * *